(12) United States Patent
Casanova et al.

(10) Patent No.: US 7,080,570 B2
(45) Date of Patent: Jul. 25, 2006

(54) DRIVE DEVICE FOR MACHINE TOOLS

(75) Inventors: Pierre Casanova, Montargis (FR); Pierre Vaslier, Ladon (FR); Jean-Bernard Tetart, Etiolles (FR)

(73) Assignee: REDEX, Ferrieres (FR)

( * ) Notice: Subject to any disclaimer, the term of this patent is extended or adjusted under 35 U.S.C. 154(b) by 538 days.

(21) Appl. No.: 10/619,583

(22) Filed: Jul. 16, 2003

(65) Prior Publication Data
US 2004/0020318 A1 Feb. 5, 2004

(30) Foreign Application Priority Data
Aug. 1, 2002 (FR) .................................. 02 09814

(51) Int. Cl.
*F16H 55/18* (2006.01)
*F16H 1/04* (2006.01)
(52) U.S. Cl. .................... 74/409; 74/422; 74/665 R
(58) Field of Classification Search .................. 74/409, 74/842, 422, 22 A, 29, 30, 34, 112, 410, 411, 74/665 R, 665 F, 665 H; 475/331
See application file for complete search history.

(56) References Cited

U.S. PATENT DOCUMENTS

| | | | |
|---|---|---|---|
| 2,902,875 A | * | 9/1959 | Finally et al. ................ 74/409 |
| 2,946,232 A | | 7/1960 | Jones |
| 4,554,842 A | | 11/1985 | Wood, III |
| 4,678,165 A | * | 7/1987 | Eloranta ....................... 254/97 |
| 4,714,388 A | | 12/1987 | Siler |
| 4,856,372 A | * | 8/1989 | Williamson ................. 475/242 |
| 5,161,424 A | * | 11/1992 | Saberton et al. .............. 74/409 |
| 5,499,549 A | * | 3/1996 | Willacy ....................... 74/422 |

FOREIGN PATENT DOCUMENTS

| | | | |
|---|---|---|---|
| GB | 1041793 | | 9/1966 |
| JP | 6-106487 | * | 4/1994 |
| JP | 2000-247246 | * | 9/2000 |
| JP | 2001-208156 | * | 8/2001 |
| JP | 2003-90407 | * | 3/2003 |

* cited by examiner

*Primary Examiner*—Richard Ridley
*Assistant Examiner*—Colby Hansen
(74) *Attorney, Agent, or Firm*—Young & Thompson

(57) ABSTRACT

A machine tool drive device comprising in a structure:
a line of inlet shafts; and
angle takeoffs, each having an outlet shaft perpendicular to the line of inlet shafts, each being coupled to the inlet of a reversible gearbox whose outlet shaft carries a pinion, for meshing with a rack, in which the line of inlet shafts comprises two shafts in alignment that are coupled together end to end by a torque transmission member that is elastically deformable in torsion, possessing declutchable elements for connection in rotation with at least one of the shafts, and in which the other end of the shaft is provided with engagement elements enabling it to be turned.

6 Claims, 2 Drawing Sheets

DRIVE DEVICE FOR MACHINE TOOLS

The present invention relates to a drive device interposed between a motor and a machine tool element in order to impart rectilinear movement to said element relative to a structure.

BACKGROUND OF THE INVENTION

In known manner, such a drive device comprises a transmission gearbox with a reduction ratio associated with a plate for fixing to the moving machine tool element, the inlet to the gearbox being coupled to a motor and its outlet being formed by two gearwheels or pinions turning synchronously and meshing with a rack secured to the structure of the machine tool and extending parallel to the direction of rectilinear movement.

This outlet via two gearwheels makes it possible to take up slack continuously by introducing into the transmission system connected to the two gearwheels a torque that tends to turn them in opposite directions, thereby guaranteeing a degree of precision in the amplitude of the rectilinear movement performed and in the positions of its tool attachment points.

In a known device of that type, the drive system comprises an inlet shaft acting via two angle takeoffs in series on said shaft to drive each of the inlet shafts of respective reducing sleeves whose outlets carry the above-mentioned gearwheels or pinions. The preloading is obtained by a torsion bar which forms a part of the inlet shaft between the angle takeoffs. The magnitude of the preloading is fixed when the device is installed on the machine tool with the pinions being engaged with the rack, by applying torsion to the bar which is accessible from an end of the device opposite from the drive moor, and by constraining one and/or both angle takeoffs in rotation on said prestressed bar.

The architecture of that device leads to a certain number of drawbacks in the sense that it constitutes a limit on standardizing manufacture of its components and it limits the stiffness of the transmission which needs to be as high as possible for controlling movement with precision.

OBJECTS AND SUMMARY OF THE INVENTION

The present invention seeks to remedy those drawbacks and to provide additional advantages to drive mechanisms of that type.

For this purpose, the invention thus provides a drive device for a machine tool, the device comprising in a structure:
 a line of inlet shafts;
 first and second angle takeoffs, each having a respective outlet shaft perpendicular to the line of inlet shafts; and
 each outlet shaft being coupled to the inlet of a reversible gearbox whose outlet shaft carries a pinion, the two pinions being for meshing with a rack,
 in which the line of inlet shafts comprises two shafts in alignment that are coupled together end to end by a torque transmission member that is elastically deformable in torsion, possessing declutchable means for connection in rotation to at least one of the shafts, and the other end of said shaft is provided with releasable engagement means enabling it to be turned.

The connection between the two shafts by means of the coupling member which is elastically deformable in torsion makes it possible to make the drive device entirely symmetrical, thereby firstly enabling manufacture of its components to be rationalized, and secondly increasing its suitability for being fitted both to the machine tool element which is to receive it and to the drive motor element to which it is to be coupled.

BRIEF DESCRIPTION OF THE DRAWINGS

Other characteristics and advantages of the device of the invention appear from the following description given by way of non-limiting example.

Reference is made to the accompanying drawings, in which.

MORE DETAILED DESCRIPTION

Figure 1:
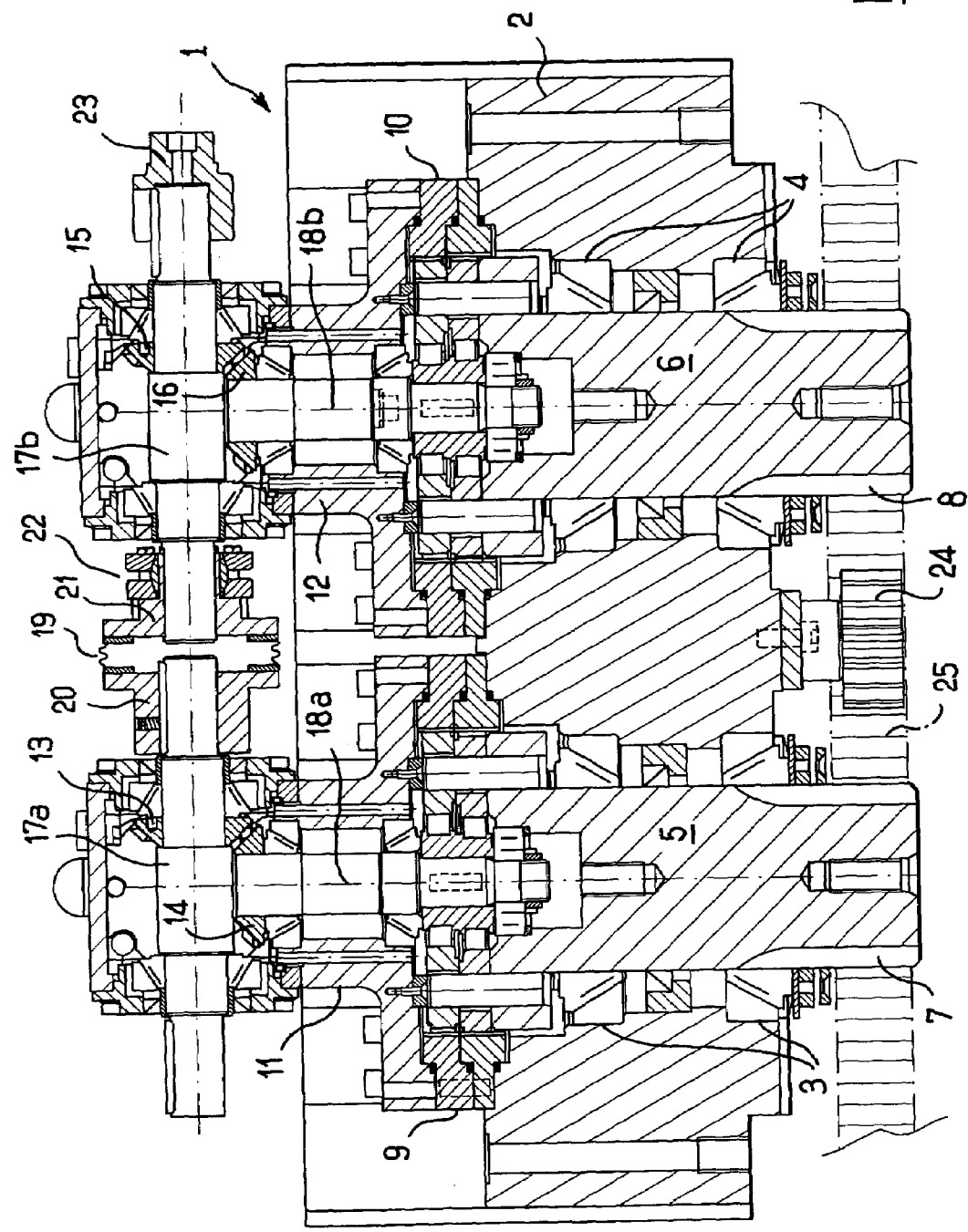
FIG. 1 is a general section view of the drive device of the invention.

The device shown in the drawings comprises a structure 1 made up of three assembled-together components. The main component 2 of the structure is a body in the form of a rectangular parallelepiped containing two bearings 3 and 4 for two outlet shafts 5 and 6 whose ends 5*a* and 6*a* project beyond one of the faces 2*a* of said element and form two gearwheels or pinions 7 and 8.

Structure element 2 carries opposite its face 2*a* the second structure component, namely two stationary ring gears 9 and 10 of two hypocycloidal reducing sleeves whose shafts 5 and 6 constitute the outlets.

Finally, the third structure component comprises two cases 11, 12 each containing the bearings of an angle takeoff gear system 13, 14, 15, 16 each having an inlet shaft 17*a*, 17*b* and an outlet shaft 18*a*, 18*b*, each of which constitutes the inlet shaft of the corresponding hypocycloidal reducing sleeve 9, 10.

The inlet shafts 17*a*, 17*b* of the angle takeoffs possess ends outside the corresponding cases 11, 12 and these shafts are in end-to-end alignment. They are coupled together by a torque transmission member 19 of known kind, which can accommodate a certain amount of misalignment between the shafts, and which above all can accept elastic deformation in torsion. This coupling member is of short axial length and it is fixed to two flanges 20 and 21, the flange 20 being keyed to the end of the shaft 17*a*, while the flange 21 is constrained to rotate with the end of the shaft 17*b* by means of a clutch member 22 which makes it possible to secure the flange 21 on the end of the shaft 17*b* as an interference fit.

The inlet end of the shaft 17*a* opposite from the member 19 is designed to be coupled to a drive motor, while the outlet end of the shaft 17*b* opposite from the member 19 can releasably receive a member 23 enabling it to be turned manually, for example an engagement member that co-operates with the shaft 17*b* by means of a key and that presents a polygonal outside surface for cooperating with a tool of the spanner type, and preferably a torque wrench.

Finally, it should be observed that a pinion 24 is present that is mounted loose on the structure element 2 so as to mesh with the rack 25 like the pinions 7 and 8, which rack is shown diagrammatically in chain-dotted lines. The pinion 24 may be made of a felt-like material and forms a supply of lubricating oil for depositing on the rack 25.

When the device of the invention meshes with the rack 25, while simultaneously being fixed to the machine tool element that is it to move, in order to obtain good precision in the movements and above all good precision in the positions reached at the end of said movements, it is necessary to eliminate all operating slack in the drive system. This is achieved in known manner by installing and maintaining torque stress continuously in the drive system connecting the two pinions 7 and 8 so that they are subjected to the effect of opposing torques that are taken up by the rack 25.

In the invention, this torsion stress or preloading is applied by declutching the connection 22 of the shaft 17b, by preventing the flange 21 from turning, e.g. by means of a special key that co-operates with the structure 1, and by using the drive member 23 to turn this shaft 17b until a determined opposing torque is obtained on said member 23. In this position, torsion stress is accumulated in the transmission member 19 and the shaft 17b is connected to the transmission member 19 by acting on the member 22. This torsion stress is accompanied by elastic deformation in torsion of the member 19, which then forms a spring for taking up slack between the pinions 7 and 8. Naturally, it should be observed that this application of preloading is possible only if the pinions 7 and 8 are engaged with a rack 25.

The member 19 is very compact, of extremely short axial length and of very great stiffness. It follows that contrary to the prior technique which used a torsion bar between the shafts 17a and 17b, there is a very high degree of stiffness in the drive system, which is advantageous in terms of vibration.

It should also be observed that all of the transmission elements relating to the pinion 7 are identical to all of the corresponding elements relating to the pinion 8. This feature is a consequence of connecting the shafts 17a and 17b together with a coupling member such as 19 instead of a torsion bar, and it makes it possible for manufacture to be more rational.

Finally, it should be observed that away from the face 2a and the opposite face along which the line of shafts 17a and 17b is constituted, the structure member 2 provides surfaces 2b, 2c, 2d, and 2d which form a corresponding number of planes enabling the device to be connected to a machine tool element.

Figure 2:
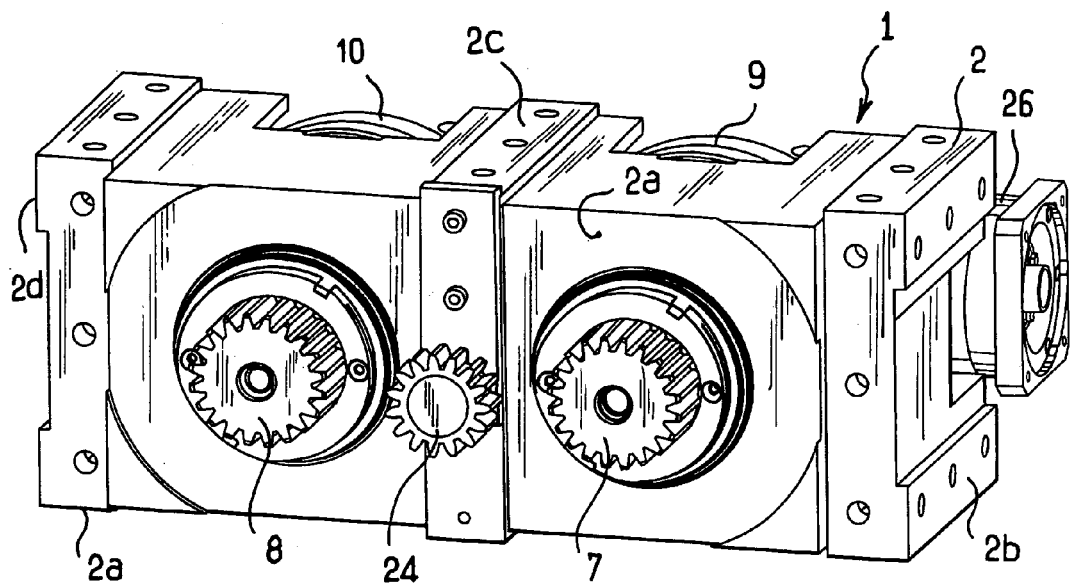
FIGS. 2 and 3 are two perspective views showing the outside of the device.
Figure 3:
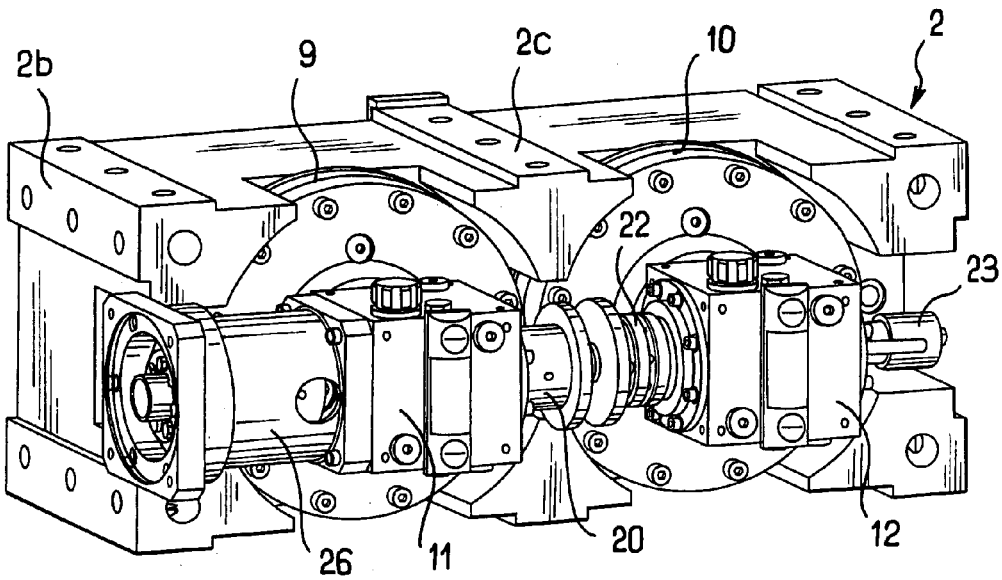

FIGS. 2 and 3 also show the presence of a sleeve 26 which surrounds the end of the shaft 17a, this sleeve 26 serving to engage a drive motor which is coupled to said inlet end by means of flanged connection device of the same type as the device 19, 20, and 21 described above.

The description given above refers to a reducing sleeve based on a hypocycloidal gearbox. Naturally, the invention relates to any other reducing sleeve such as a planetary gearbox, providing the reducing sleeve is reversible.

What is claimed is:

1. A drive device for a machine tool, the device comprising in a structure:
   a line of inlet shafts;
   first and second angle takeoffs each having a respective outlet shaft perpendicular to the line of inlet shafts; and
   each outlet shaft being coupled to the inlet of a reversible gearbox whose outlet shaft carries a pinion, the two pinions being for meshing with a rack,
   wherein the line of inlet shafts comprises two shafts in alignment that are coupled together end to end by a torque transmission member that is elastically deformable in torsion, said line of input shafts possessing declutchable means for connection in rotation to at least one of the shafts, and
   wherein the other end of said shaft is provided with releasable engagement means enabling it to be turned.

2. A device according to claim 1, wherein the shafts of the line of inlet shafts and the angle takeoffs and their cases are identical.

3. A device according to claim 2, wherein the coupling ends of the two shafts of the line of inlet shafts are identical.

4. A device according to claim 1, wherein the structure comprises a main element that is substantially in the form of a rectangular parallelepiped with the line of inlet shafts extending along one of its faces and with the outlet pinions projecting from the opposite face parallel to the preceding face, the other four faces forming faces suitable for fixing the device to a machine tool.

5. A device according to claim 1, wherein, with the exception of the structure and the torque transmission member, the drive and support members relating to either pinion, including said pinion, are identical to the corresponding members relating to the other pinion.

6. A device according to claim 1, including an oiling pinion mounted loose on the structure between the two said pinions.

* * * * *